United States Patent
Meyer

(10) Patent No.: US 11,420,210 B2
(45) Date of Patent: Aug. 23, 2022

(54) STACKABLE CONSUMABLE CARRIER WITH LOCKING DEVICE AND HANDLING INTERFACES

(71) Applicant: STRATEC SE, Birkenfeld (DE)

(72) Inventor: Andreas Meyer, Keltern (DE)

(73) Assignee: STRATEC SE, Birkenfeld (DE)

( * ) Notice: Subject to any disclaimer, the term of this patent is extended or adjusted under 35 U.S.C. 154(b) by 134 days.

(21) Appl. No.: 16/895,029

(22) Filed: Jun. 8, 2020

(65) Prior Publication Data

US 2020/0406265 A1    Dec. 31, 2020

(30) Foreign Application Priority Data

Jun. 6, 2019    (LU) .......................................... 101262

(51) Int. Cl.
*B01L 9/00* (2006.01)
*B01L 3/00* (2006.01)

(52) U.S. Cl.
CPC ............. *B01L 9/523* (2013.01); *B01L 3/5085* (2013.01); *B01L 3/545* (2013.01); *B01L 2300/022* (2013.01); *B01L 2300/0803* (2013.01)

(58) Field of Classification Search
CPC ..... B01L 2300/0822; B01L 2300/0809; B01L 2300/0825; B01L 3/5085
USPC .................................................. 422/563, 560
See application file for complete search history.

(56) References Cited

U.S. PATENT DOCUMENTS

2003/0235906 A1    12/2003  Shea et al.
2005/0153453 A1*    7/2005  Copeland ............. G01N 35/025
                                                          436/180

* cited by examiner

*Primary Examiner* — Natalia Levkovich
(74) *Attorney, Agent, or Firm* — 24IP Law Group USA, PLLC; Timothy DeWitt

(57) ABSTRACT

A carrier for consumables which are mainly used in laboratory (analytic) applications and provides a carrier for consumables, comprising a ground plate with at least two cut-outs for accommodating a consumable, a clamp plate with at least one clamp extending partially above the cut-outs and a locking lever movably connected with the clamp plate, wherein the locking lever has at least a cam located at an end connected with the clamp plate, wherein the cam presses in a locking position of the locking lever the clamp plate towards the ground plate and releases in a releasing position a gap between ground plate and clamp plate.

13 Claims, 4 Drawing Sheets

Fig. 3A
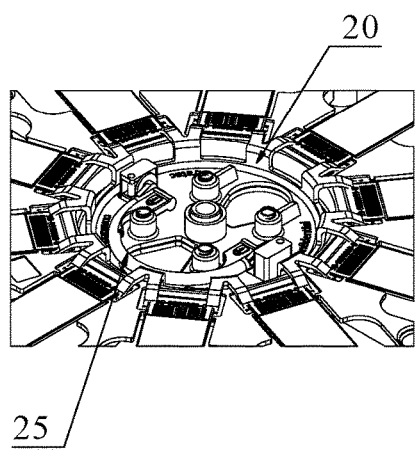
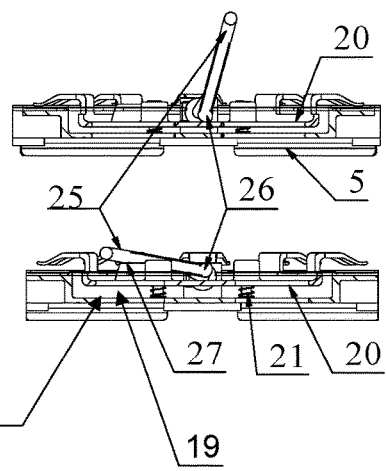
Fig. 3B
Fig. 3C
Fig. 4
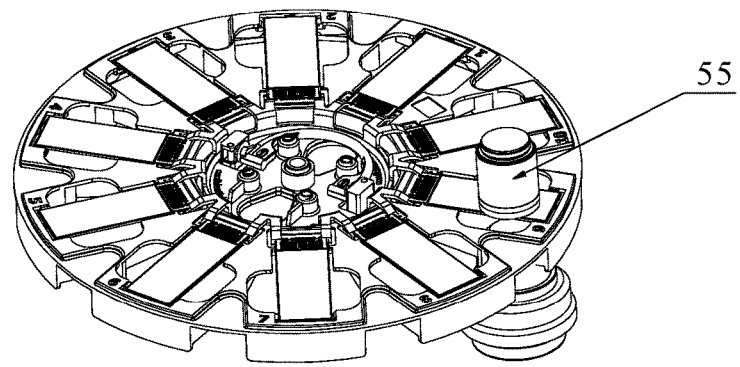

STACKABLE CONSUMABLE CARRIER WITH LOCKING DEVICE AND HANDLING INTERFACES

CROSS-REFERENCE TO RELATED APPLICATIONS

The present application claims priority to Luxembourg Patent Application No. LU 101262 filed on Jun. 6, 2019. The aforementioned application is hereby incorporated by reference in its entirety.

BACKGROUND OF THE INVENTION

Field of the Invention

The invention relates to relates to a carrier for consumables which are mainly used in laboratory (analytic) applications.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

Carrier for microscope slides with fix mounted clamping springs are known in the prior art. The slides need to be pushed ("forced") below the springs for loading into such carriers. An additional positioning or alignment of the slides inside the carrier is usually also required.

Rack carrier suitable for vertically stacking microscope slides are also known in the prior art. The slides are separated from said carrier for further processing by pulling them out of the carrier at an opposite side of the slides to the one arranged in the carrier.

Carrier for microscope slides with an integrated support, positioning and fixation features are further known in the prior art. The slides will have to be "forced" into the holder by displacement of the positioning and fixation features.

Finally, carrier for microscope slides which can be attached to an optical device like a microscope are also known. In most cases such carrier, which are a part of the microscope stage, provide a capacity for a single slide. Positioning and fixation are achieved via spring clamps or diverse spring-loaded retain elements. In some cases, the elements must be kept open for insertion of a slide.

Published U.S. Patent Application No. US 2003/0235906 A discloses devices and methods for assaying a sample for the presence of at least one analyte are provided. The subject compression devices include a base and a cover configured to apply a compression force to a structure comprising a first substrate separated from a second substrate by a separator when present in the device. The subject methods include contacting a sample with a first surface of a first substrate to produce a substrate supported sample, placing the substrate supported sample in contact with a second substrate to form a structure that includes the first and second substrates spaced-apart from each other by a separator, wherein one of the substrates is an array substrate having at least one array, applying a compression force to compress the structure together using a compression device and reading the at least one array to obtain a result. The disclosed device relates to applying a pressure for compression and does not minimize the applied force or covered part to a consumable.

When consumables are located in a rack carrier, they will have to be separated for the measurement or other processing steps. Additional handling complexity results for user and instrument in particular for consumables without explicit handling interfaces.

Consumables will be "forced" in the holder. Thereby positioning or clamping features need to be displaced. This could cause abrasion which enters sensitive areas of the instrument (e.g. measurement unit). This will reduce the system reliability and increase the effort for cleaning/decontamination. The damaging of the consumables is also possible.

Design of some carriers requires two-hand operation. For loading or unloading of the consumables the carriers need to be held/fixated with one hand. The other hand equips the carriers. Partially positioning or holding features need to be unlocked and held during the loading or un-loading procedure.

After loading the manual positioning/alignment of the consumables is required.

Available carriers do not provide (appropriate) handling features especially for the user (e.g. recessed grips, handles, finger holes etc.). This makes handling difficult and leads to a bad usability and user acceptance

SUMMARY OF THE INVENTION

It is therefore the object of this invention to provide a consumable carrier facilitating handling for a user and an automated analyzer.

The present invention provides a carrier for consumables, comprising a ground plate with at least two cut-outs for accommodating a consumable, a clamp plate which is arranged in a recess of the ground plate, wherein said clamp plate comprises at least one clamp extending partially above the cut-outs of the ground plate and a locking lever movably connected with the ground plate, wherein the locking lever has at least a (one) cam located at an end in contact with the clamp plate, wherein said cam presses in a locking position of the locking lever the clamp plate and the at least one clamp towards a bottom plate of the ground plate's recess for fixation of consumables that are placed in a cut-out with the at least one clamp and releases in a releasing position a gap between ground plate and the clamp plate for releasing consumables that are arranged in a cut-out by lifting the at least one clamp.

The carrier of the present invention may further provide that the at least one clamp is arranged between clamp plate and ground plate.

In a further aspect of the invention, the ground plate may have a circular shape with radially arranged cut-outs and the clamp plate may be arranged centrally in a recess of the ground plate.

It is further intended that the locking lever may have semicircle or bent shape and has a cam at both ends which are connected to the ground plate.

In a further aspect of the present invention, the carrier may have clamp springs as the at least one clamp extending at least partially over one end of the cut-outs.

It is further envisaged that the ground plate may have at its lower side of its outer circumference a protrusion as a centring collar that fits into a surrounding recess on the upper side of the ground plate's outer circumference.

In a further embodiment of a consumable carrier according to the invention, the ground plate may have a label providing information about the consumables loaded on the carrier.

In a further aspect, the carrier may have a label or position marker arranged next to each cut-out.

It is also intended that the carrier may have label or position marker which are numbers, barcodes or RFID tags.

The invention relates further to a system for providing consumables comprising a carrier as described above and a consumable suitable for arranging and locking in a cut-out of the consumable carrier.

In a further aspect of the system, the consumables can be microscope slides, flow cells, microfluidic chips, well plates or other sample holders.

The invention relates further to a method for arranging consumables, comprising the steps of
a. Providing a carrier as described above or a system as described above;
b. Arranging at least one consumable in at least one cut-out;
c. Locking the at least one consumable by bringing the locking lever in a locking position so that the at least one cam presses the clamp plate against the ground plate.

The method may further comprise the step of stacking at least two carrier.

In a further aspect of the method, the step of inserting at least one carrier with at least one locked consumable into an automated analyser system may be comprised.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

FIG. 3A-C show a locking state and a releasing state with an intermediate position of the locking lever.

FIG. 4 shows processing of a consumable arranged in a consumable carrier by an optic.

DETAILED DESCRIPTION OF THE INVENTION

The technical problem is solved by the independent claims. The dependent claims cover further specific embodiments of the invention.

The present invention relates to a carrier for consumables which are mainly used in laboratory applications such as for analytic or diagnostic assays in automated analyzer systems. Such consumables can be microscope slides, flow cells, microfluidic chips, well plates or other sample holders. The consumable carrier of the present invention represents a human-machine-interface which primarily supports manual and automated process steps and reduces the overall handling complexity in a laboratory workflow. It allows the simultaneous handling of multiple consumables which do not have individual or suitable handling features (especially for automation) like microscope slides. This refers to handling processes inside and/or outside of an instrument. The design of the consumable carrier shall in particular provide system reliability, processes stability, functional safety, error prevention and usability. A special feature of the carrier is its possible use in applications where the analysis is carried out via optical evaluation measurement (e.g. fluorescence microscopy).

The core of the invention relates to a mechanism allowing to lock and release the consumables in or onto the carrier. The lock and release mechanism allows further for a force-free insertion and removal of the consumables. The consumables may be fixed at the same time with only one actuation. Additional features may be present for positioning or referencing of the consumables inside the carrier for the automated handling inside or outside of an automated analyzer.

Figure 1:
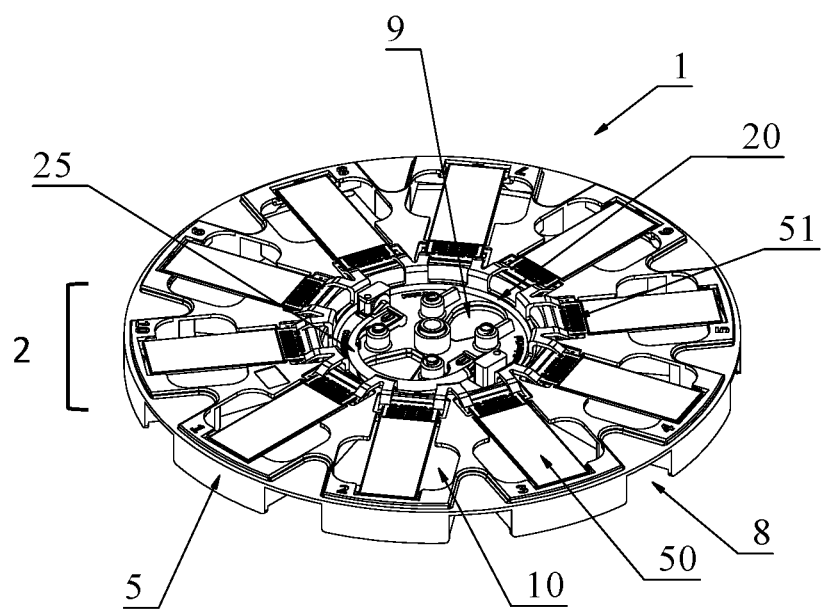
FIG. 1 shows a consumable carrier having a circular disc shape.

FIG. 1 shows an embodiment of a consumable carrier 1 having a circular disc shape that accommodates up to ten microscope slides 50 around a centrally arranged clamp plate 20. The consumable carrier comprises a ground plate 5 with cut-outs 10 for accommodating consumables, which are in the embodiment shown in FIG. 1 microscope slides 50. A spring-loaded clamp plate 20 is used for fixation of the slides to the ground plate 5 and a locking lever 25 allows the opening and closing of the fixation mechanism in a single step. The microscope slides 50 shown in FIG. 1 are each equipped with a barcode label 51 and a coverslip.

Microscope slides 50 represent a good example for consumables lacking explicit handling features. The shape and texture of the rectangular glasses make handling extremely difficult, not only for machines but also for the handling by a user. A consumable carrier 1 according to the present invention provides a kind of a functional interface between a user and an instrument for facilitating the use of consumables like microscope slides 50 and may be designed for supporting further different consumable related handling steps in a laboratory workflow. Accordingly, each consumable carrier 1 according to the invention provides interfaces, on one hand for the manual handling by a user (e.g. transport of carriers within the lab) and on the other hand for the automated handling by an automated analyzer, e.g. their transport by robotics in an automated analyzer.

The ground plate 5 has a recess so that the clamp plate 20 can be placed in said recess of the ground plate. It is intended that a centrally arranged pin of the ground plate may be used for a central arrangement of the clamp plate 20, which has a corresponding hole in its central position. Counter bearings for the locking lever 25 may protrude from a bottom plate of the recess. Thus, the clamp plate is arranged within the ground plate in a releasing and locking position, because it remains in the recess of the ground plate.

Handling features like recessed grips 8 or finger holes 9 are part of a structured surfaces of ground plate 5 facilitating a user's operation. FIG. 1 also shows such features for the circular consumable carrier. Further functionalities which are required for the automated manipulation may also be integrated in the consumable carrier according to the present invention (e.g. robot interface for transport or features for the sensing of the single consumable positions).

Another very important function of the carrier is to keep the accommodated consumables in place regarding their spatial position and orientation after loading and along the manual or automated process steps. Therefore, a consumable carrier according to the invention may provide consumable-specific interfaces comprising support and reference surfaces for instance. The microscope slides 50 may also be fixed in the disc-shaped consumable carrier according to FIG. 1. The locking mechanism comprises a locking lever 25 in FIG. 1) that the consumables after their loading.

Figure 2:
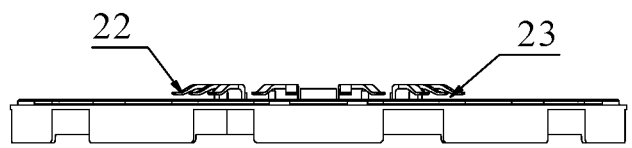
FIG. 2 shows a gap in a leasing state of the clamp plate or locking lever, respectively.

The consumables can be manually loaded and unloaded. The above-mentioned fixation mechanism will have to be opened prior to (re-)loading, the centralized clamp plate 20 moves upwards and releases simultaneously all circular arranged consumables by flipping locking lever 25. FIG. 2 illustrates the resulting gap 23 between the microscope slides (not shown) and the clamp springs 22 in a released state.

The central slide fixation shown in FIG. 3A-C comprises a spring-loaded clamp plate 20 and a locking lever 25 with an integrated cam mechanism. Depending on the locking lever's position, the cam 26 allows expansion or the compression of the springs 21, which in turn causes an upward or downward movement of the clamp plate 20. FIG. 3A shows a locking state, where the cams at both ends of the bent locking lever 25 press the springs 21 below the clamp plate 20 towards the ground plate 5. FIG. 3B shows that the clamp plate 20 moves upwards by turning the locking lever to the other side, which is shown in FIG. 3C. The locking lever 25 rests on the bars 27 and due to the fact that no cams are present on both sides of the locking lever's ends, the clamp plate 20 is in a releasing state so that slides would not be fixed.

The upwards directed movement of the clamp plate ensures the free and easy insertion (loading) of all consumables like microscope slides. The disc format in combination with the circular arrangement provides sufficient openings for the user's finger for loading, unloading and optional positioning of consumables within the consumable carrier. Compared to other state-of-the-art solutions, it is not required to keep or hold a fixation mechanism actively open during loading or unloading. The present invention provides a solution with two states, a locking state and a releasing state, where a user can load, or an automated analyzer can process samples. This improves the usability and increases the user convenience, the consumables can be secured in in one step after loading them by simply closing the clamp mechanism.

Optionally further positioning features may be implemented for a repeatable alignment of consumables inside the carrier (not shown). Such an "automatic" alignment provides several advantages regarding an automated processing and reduces the necessity of user interventions in manual consumables positioning. It increases further the system reliability and process stability and decreases finally the time for consumable identification or localization processes (e.g. edge detection) by the instrument.

Optical measurement techniques are applied for sample analysis in the majority of analytical applications. The consumables which are carrying the samples have to remain in the carrier during their processing to keep the handling effort at a minimal level. The horizontal ("lying") arrangement of the consumables in a single plane avoids the necessity to separate the consumables from the carrier for measurement steps so that they can be processed in a fixed or locked state. It also allows the simultaneous processing of multiple consumables in the same carrier. The microscope slides 50 shown in FIG. 1 for example which are arranged horizontally on the circular consumable carrier 1 can be directly scanned after their positioning in a measurement unit. FIG. 4 shows such a process schematically for a bright-field application with optics 55.

Accordingly, a consumable carrier shall be designed in a way which does not interfere with illumination and imaging of the samples. Support surfaces are not located in the "measurement window/corridor" and the carrier itself shall have a design that avoids shadows or reflections in the region of interest of the sample plane. The design shown in FIG. 1-4 has reduced or minimized support and reference surfaces to keep the measurable (useable) area as large as possible. Furthermore, the carrier can be structured to minimize negative effects of stray light. The color, surface and material of the consumable carrier may be adapted or changed depending on the respective application.

Figure 5:
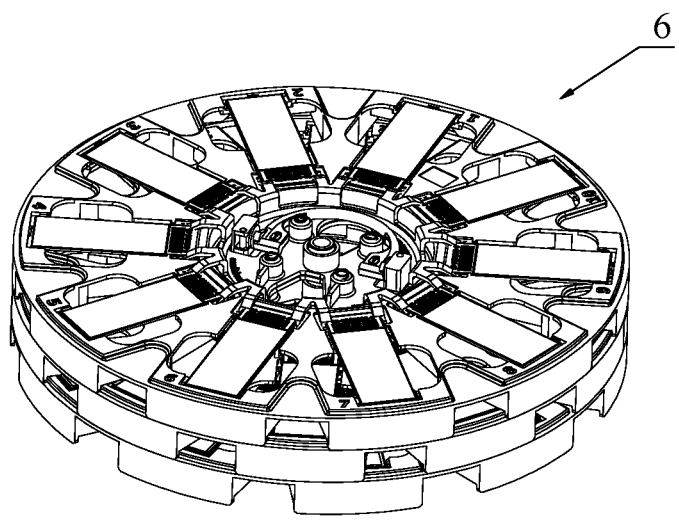
FIG. 5 shows a stack of consumable carrier.

Furthermore, the design provides the possibility to stack consumable carriers according to the present invention for storage and handling purposes. FIG. 5 shows a stack of consumable carriers as shown in FIG. 1-4. Stacking of carriers loaded with consumables outside of an automated analyzer and prior to its loading saves time and space within the lab and. Additionally, the user will be enabled to transport multiple consumable carrier in a single step. Depending on the instrument architecture of an automated analyzer even the loading of a consumable carrier stack to an analyzer may be possible.

The present invention provides in a further aspect of the invention a design that allows an intuitive and easy stacking of the carriers 6 as shown in FIG. 5. A rotary orientation or alignment of the consumable carrier is not required, but they are not stackable with an open locking mechanism to prevent the handling of unattached consumables. Relative movements between stacked consumable carriers in radial direction shall be prevented by a centering collar located at the outer circumference of the ground plate so that stacking and safe handling of the consumable carriers according to the present invention will be certain.

Figure 6:
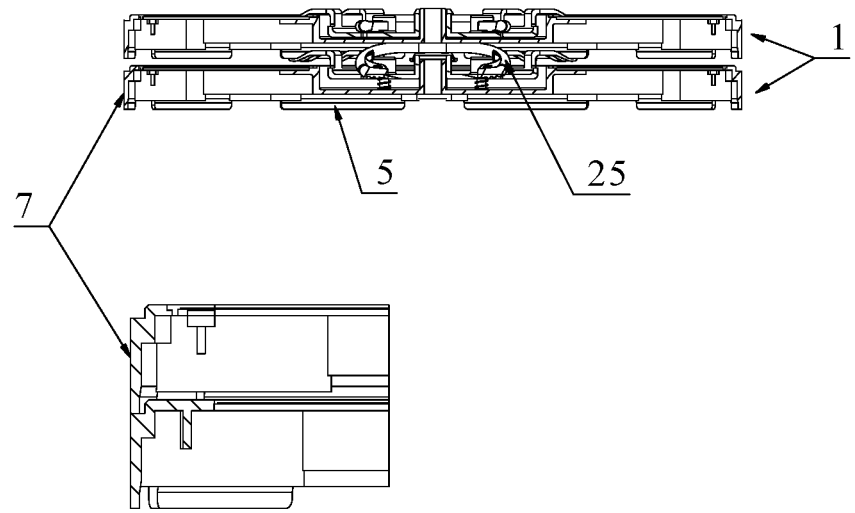
FIG. 6 shows stacking features of consumable carrier according to the invention.

FIG. 6 shows in its upper part a mechanical interference between two carriers caused by an unlocked locking lever 25. The centering collar 7 at the outer circumference of the ground plate 5 cannot engage to avoid relative movements between stacked carriers. Thus, the present invention provides safety features for users if ground plates with unlocked locking lever are intended to be stacked.

Figure 7:
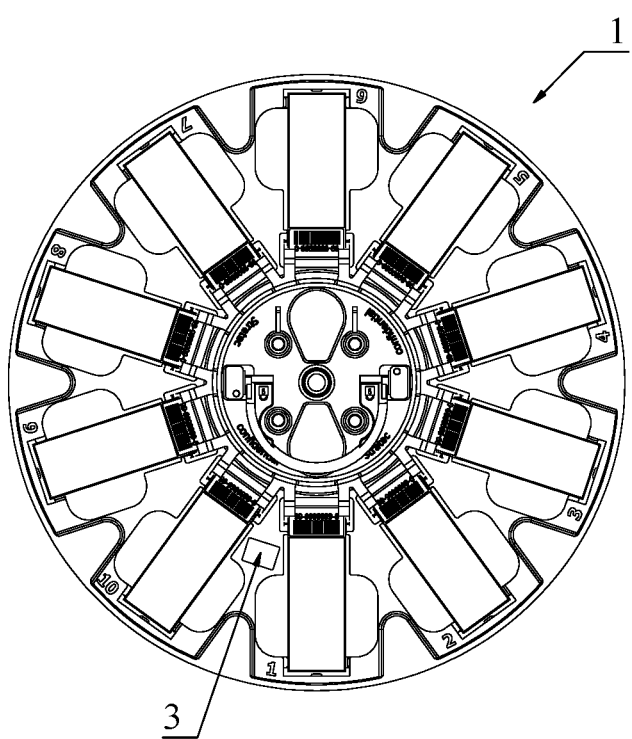
FIG. 7 is a top view of a consumable carrier with unique identifier

A unique identifier like a label 3 with an identification number, a 1D/2D barcode or an integrated RFID tag may ensure that every consumable carrier 1 readable by a user or the automated analyzer. Such an identifier allows the allocation between loaded consumables and the carrier. The traceability will also be improved by using unique position numbers, e.g. next to the consumable interfaces (FIG. 7). Such number may also be machine readable like barcodes or 2D-codes.

The present invention provides an adapted human-machine-interface for the support of manual or automated handling of consumables without own or suitable handling features which reduces the handling complexity for a user and the instrument during processing of samples (reduced instrument complexity). The system reliability is improved, the process stability increased, the functional safety improved, and the risk of errors reduced. A consumable carrier according to the invention provides further automated handling options outside the instrument (e.g. instrument feeder).

Another advantage is that multiple consumables can be loaded in parallel or in a single step so that less handling effort results, and simultaneous processing of consumables will be possible.

The orientation of multiple consumables side by side in a single plane is further related to the advantage that the consumables will not have to move to process them individually or in parallel.

It can further be regarded as an advantage that the consumable is only minimally covered by parts of the carrier so that the assay can be processed without any further handling of the consumable. The consumable itself will not be put under appreciable pressure; it will only be fixed in the carrier but allows precise processing of samples for instance which are located in or on the consumable.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 consumable carrier
2 recess
3 label
4 surface of the bottom of circular ground plate
5 circular ground plate
6 stack
7 collar
8 recessed grips
9 finger hole
10 cut-out
19 first gap
20 clamp-plate
21 spring
22 clamp
23 second gap
25 locking lever
26 cam
27 bar
50 microscope slide
51 barcode
55 optics

What is claimed is:

1. A carrier for consumables, comprising
a circular ground plate with at least two radially arranged cut-outs for accommodating consumables; and
a spring loaded clamp plate which is arranged in a centrally located recess of the circular ground plate, wherein said spring loaded clamp plate comprises
at least one clamp for each of the at least two radially arranged cut-outs, each extending partially above the at least two radially arranged cut-outs of the ground plate; and
a locking lever which has a semi-circular shape and is movably connected with both of its two ends to the ground plate, wherein the locking lever comprises at least on one of its two ends a cam in contact with the spring loaded clamp plate;
wherein said cam is configured to press the spring-loaded clamp plate towards a surface of a bottom of the circular ground plate's recess in a locking position for fixation of the consumables that are placed in the radially arranged cut-outs with the at least one clamp, and wherein the cam is further configured to provide in a releasing position a first gap between the surface the bottom of the circular ground plate's recess and the spring loaded clamp plate for releasing the at least one clamp for each of the at least two radially arranged cut-outs by a second gap from the consumables that are arranged in the at least two radially arranged cut-outs by lifting the at least one clamp.

2. The carrier of claim 1, wherein at least one spring is arranged between the spring loaded clamp plate and the bottom of the circular ground plate.

3. The carrier of claim 1, wherein the locking lever comprises a cam at both ends connected to the ground plate.

4. The carrier of claim 1, wherein the at least one clamp for each of the at least two radially arranged cut-outs is a clamp spring that extends at least partially over one end of the radially arranged cut-outs.

5. The carrier of claim 1, wherein the circular ground plate comprises at its lower side of its outer circumference a centring collar that is configured to fit into a surrounding recess on the upper side of the ground plate's outer circumference.

6. The carrier of claim 1, wherein the circular ground plate comprises a label providing information about the consumables.

7. The carrier of claim 1, wherein the carrier has a label or a position marker arranged next to each of the radially arranged cut-out.

8. The carrier of claim 7, wherein the label or the position marker are selected from the group comprising numbers, barcodes and RFID tags.

9. A system for providing consumables comprising a carrier according to claim 1, and a consumable fitting into a radially arranged cut-out.

10. The system of claim 9, wherein the consumables are microscope slides, flow cells, microfluidic chips, well plates or other sample holders.

11. A method for arranging consumables, comprising the steps of
providing a carrier according to claim 1;
arranging at least one consumable in at least one radially arranged cut-out;
locking the at least one consumable by bringing the locking lever in a locking position so that the cam presses the spring loaded clamp plate against the bottom of the circular ground plate.

12. The method of claim 11, further comprising the step of stacking at least two carrier.

13. The method of claim 11, further comprising the step of inserting at least one carrier with at least one locked consumable into an automated analyser system.

* * * * *